United States Patent
Qiu et al.

(10) Patent No.: US 10,671,607 B2
(45) Date of Patent: Jun. 2, 2020

(54) PIPELINE DEPENDENT TREE QUERY OPTIMIZER AND SCHEDULER

(71) Applicant: Futurewei Technologies, Inc., Plano, TX (US)

(72) Inventors: Min Qiu, Fremont, CA (US); Ron-Chung Hu, Palo Alto, CA (US); Masood Mortazavi, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 807 days.

(21) Appl. No.: 15/274,681

(22) Filed: Sep. 23, 2016

(65) Prior Publication Data

US 2018/0089270 A1   Mar. 29, 2018

(51) Int. Cl.
G06F 16/00 (2019.01)
G06F 16/2453 (2019.01)
G06F 16/22 (2019.01)

(52) U.S. Cl.
CPC .... G06F 16/24544 (2019.01); G06F 16/2246 (2019.01); G06F 16/24542 (2019.01); G06F 16/24545 (2019.01)

(58) Field of Classification Search
None
See application file for complete search history.

(56) References Cited

U.S. PATENT DOCUMENTS

| 7,472,112 | B2 * | 12/2008 | Pfleiger | G06F 16/8358 |
| 7,493,337 | B2 * | 2/2009 | Chaudhuri | G06F 16/217 |
| 7,574,424 | B2 * | 8/2009 | Chowdhuri | G06F 16/24532 |
| 7,680,784 | B2 * | 3/2010 | Furuya | G06F 16/24553 |
| | | | | 707/999.004 |
| 9,495,207 | B1 * | 11/2016 | Pjesivac-Grbovic | G06F 9/546 |
| 9,984,134 | B2 * | 5/2018 | Imai | G06F 16/258 |
| 10,216,793 | B2 * | 2/2019 | Ji | G06F 16/24542 |
| 2013/0103670 | A1 | 4/2013 | Kashyap | |
| 2013/0151504 | A1 * | 6/2013 | Konig | G06F 16/245 |
| | | | | 707/718 |
| 2014/0214880 | A1 | 7/2014 | Chi et al. | |
| 2017/0004173 | A1 * | 1/2017 | Simitsis | G06F 16/24542 |
| 2018/0261820 | A1 * | 9/2018 | Liao | H01M 2/1686 |

FOREIGN PATENT DOCUMENTS

| CN | 102323946 | 1/2012 |
| CN | 102521307 | 6/2012 |

OTHER PUBLICATIONS

"International Application No. PCT/CN2017/100835, International Search Report dated Dec. 7, 2017", (Dec. 7, 2017), 11 pgs.

* cited by examiner

*Primary Examiner* — Debbie M Le
(74) *Attorney, Agent, or Firm* — Schwegman Lundberg & Woessner, P.A.

(57) ABSTRACT

A method includes traversing a query plan tree having multiple nodes, each node representative of an operation on data that is the subject of a query, to extract multiple pipelines from the query plan tree, identify dependencies between the multiple extracted pipelines, and provide a pipeline dependent tree based on the dependencies between the multiple extracted pipelines for execution of the query by multiple processors.

17 Claims, 8 Drawing Sheets

US 10,671,607 B2

PIPELINE DEPENDENT TREE QUERY OPTIMIZER AND SCHEDULER

FIELD OF THE INVENTION

The present disclosure is related to query optimizers and in particular to a pipeline dependent tree query optimizer with high inter-pipeline parallelism.

BACKGROUND

Traditional query processing engines represent a plan for performing a query with a tree of plan nodes, referred to as a query plan tree. A plan node encapsulates a single operation that is used to execute the query. The nodes are arranged as a tree in which intermediate results flow from a bottom or leaves of the tree to the top. Each node has zero or more child nodes. A child node has an output that is fed as an input to a parent node. For example, a join node will have two child nodes, which represent the two join relations, whereas a sort node would have a single child node representing the input to be sorted. The leaves of the tree are nodes which produce results by scanning stored data, for example, by performing an index scan or a sequential full table scan.

The query plan tree includes multiple nodes comprising operators implemented as an iterator. The iterator generally follows an open-next-close protocol. In a "volcano-style" query processing engine, the use of such a query plan tree may result in many virtual functions calls corresponding to the number of operators for each row being used. Extensive memory load and store may result, consuming significant resources and time to perform the query.

Another type of query processing engine generates code to perform the query with just in time compilation. Operators are fused in an execution unit referred to as a pipeline which is compiled into a single function. Code generation creates native code instead of interpreting the code. Such a fused execution unit lacks cost information and makes optimization difficult, and query processing is performed in a strictly bottom-up manner, limiting the manner of execution.

SUMMARY

A method includes extracting, by one or more processors, multiple pipelines from a query plan tree that has multiple nodes and is stored in a memory, wherein each node is representative of an operation on data that is the subject of the query, by traversing the query plan tree to identify a sequence of nodes for each pipeline and starting a new pipeline as a function of encountering a pipeline breaker node that corresponds to a node representing an operation that materializes an intermediate result, identifying dependencies between the multiple extracted pipelines, and generating a pipeline dependent tree based on the dependencies between the multiple extracted pipelines for execution of the operations represented by the sequence of nodes in each pipeline by multiple processors.

A device includes a non-transitory memory storage comprising instructions and one or more processors in communications with the memory storage. The one or more processors execute the instructions to traverse a query plan tree having multiple nodes, each node representative of an operation on data that is the subject of a query, to extract multiple pipelines from the query plan tree that has multiple nodes and is stored in a memory, wherein each node is representative of an operation on data that is the subject of the query, by traversing the query plan tree to identify a sequence of nodes for each pipeline and starting a new pipeline as a function of encountering a pipeline breaker node that corresponds to a node representing an operation that materializes an intermediate result, identify dependencies between the multiple extracted pipelines, and generate a pipeline dependent tree based on the dependencies between the multiple extracted pipelines for execution of the operations represented by the sequence of nodes in each pipeline by multiple processors.

A non-transitory computer-readable media storing computer instructions, that when executed by one or more processors, cause the one or more processors to perform the steps of traversing a query plan tree having multiple nodes, each node representative of an operation on data that is the subject of a query, to extract multiple pipelines from the query plan tree, identify dependencies between the multiple extracted pipelines, and provide a pipeline dependent tree based on the dependencies between the multiple extracted pipelines for execution of the query by multiple processors.

DETAILED DESCRIPTION

Figure 1:
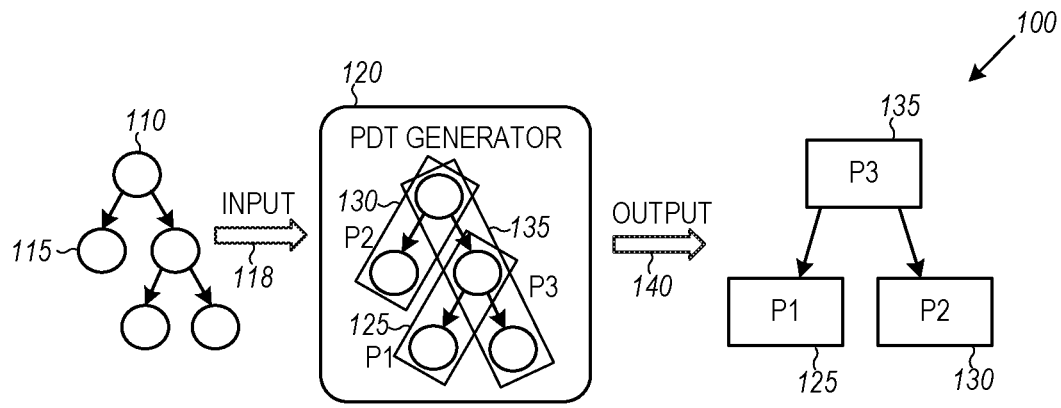
FIG. 1 is a block flow diagram representation of generation of a pipeline dependent tree for a query according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A query is represented by a plan tree which may have complex algebraic expressions. The tree comprises multiple nodes, where each node is an operator. In prior query processing methods, the plan tree may have its operators fused into an execution unit called a pipeline which is then compiled into a single function. Such query processing methods lack the ability to utilize cost based optimization of parallel scheduling due to a lack of cost information on the pipeline.

In various embodiments, systems and methods implemented on a computer system generate a pipeline dependent tree which may utilize multiple pipelines from a received query plan tree, optimize query processing by applying a cost model on the pipeline dependent tree, and schedule execution of the pipeline dependent tree with high inter-pipeline parallelism, allowing advantage to be taken of modern computer processing unit architectures which utilize multiple processors.

The multiple pipelines may be scheduled on one or more processors dependent on various scheduling approaches such as least wait time based scheduling, where the pipelines may be scheduled to run without violating data dependencies among the pipelines. In some embodiments, a greedy algorithm may be used to fit each pipeline into a few groups, such as a number of multi-processor hosts. Locality aware dispatching of pipelines may also be used to minimize shuffling of data needed for two or more dependent pipelines.

In various embodiments, efficient pipeline generation is performed for a pipeline-based query processing system. Significant performance improvements may be realized for complex analytics processing, and the pipeline generation and scheduling may be portable to existing large-scale analytics processing.

FIG. 1 is a block flow diagram representation 100 of generation of a pipeline dependent tree for a query according to an example embodiment. A query plan tree 110 having multiple nodes 115 is input at 118 to a pipeline dependent tree (PDT) generator 120. The pipeline dependent tree generator 120 traverses the query plan tree 110 and identifies multiple pipelines indicated at 125, 130 and 135, indicates as P1, P2, and P3. An output 140 is generated for execution by one or more processors of a host or hosts. The output 130 is shown as P1 125 and P2 130 being child nodes of P3 135. A simple execution of the pipeline dependent tree may involve separate processors performing P1 and P2 in parallel and providing results to a single processor for performing P3.

In one embodiment, traversing the query plan tree uses an iterative post-order traversal of the query plan tree to visit each node only once. This allows the generation of a pipeline dependent tree from any query without hard-coding pipelines.

Figure 2:
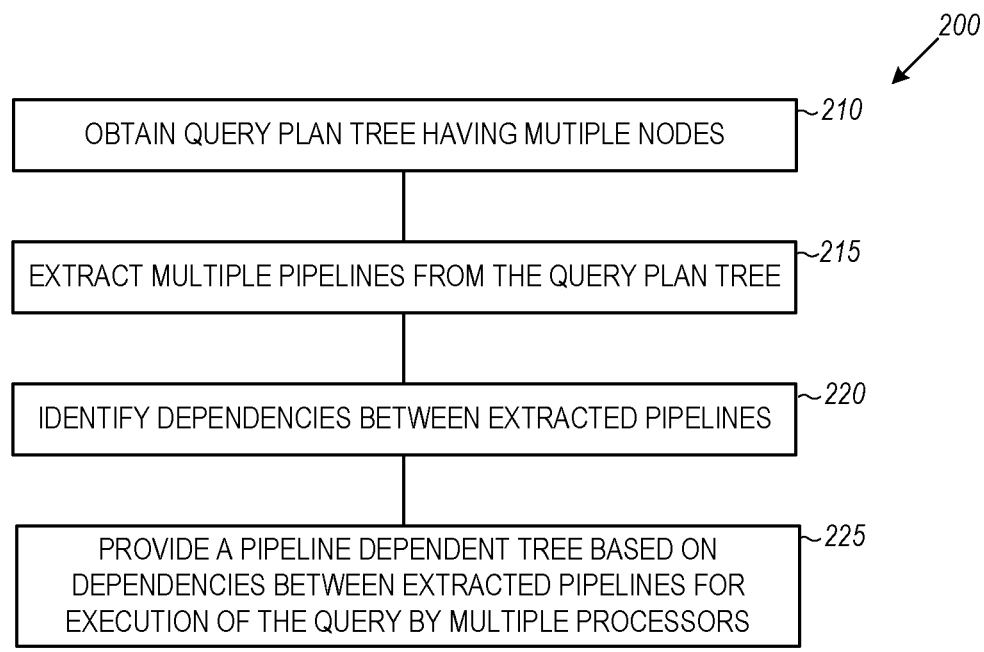
FIG. 2 is a flowchart illustration of a method of generating a pipeline dependent tree according to an example embodiment.

FIG. 2 is a flowchart illustration of a method 200 of generating a pipeline dependent tree according to an example embodiment. Method 200 includes obtaining a query plan tree at 210. The query plan tree has multiple nodes, each node representative of an operation on data that is the subject of a query. At 215, the query plan tree is traversed to extract multiple pipelines from the query plan tree at 220, identify dependencies between the multiple extracted pipelines at 225, and at 230, provide a pipeline dependent tree based on the dependencies between the multiple extracted pipelines for execution of the query by multiple processors.

Details of each of these operations are provided in further detail below following discussion of a simple query, corresponding query plan tree, pipeline identification, and pipeline tree generation corresponding to the simple query.

A query may be obtained from a user or automated report or other source in various embodiments. One example query, such as a structured language query (SQL) is used to illustrate the generation of a pipeline tree is:
SELECT y1.c1 as c1, t2.c2 as c2
FROM tab1 t1, tab2 t2, tab3 t3
WHERE t1.c0=t2.c0 and t2.c1=t3.c1 and t1.c2=5
"tab" and "t" refer to tables in a database, and "c" refers to various columns in the corresponding tables.

Figure 3:
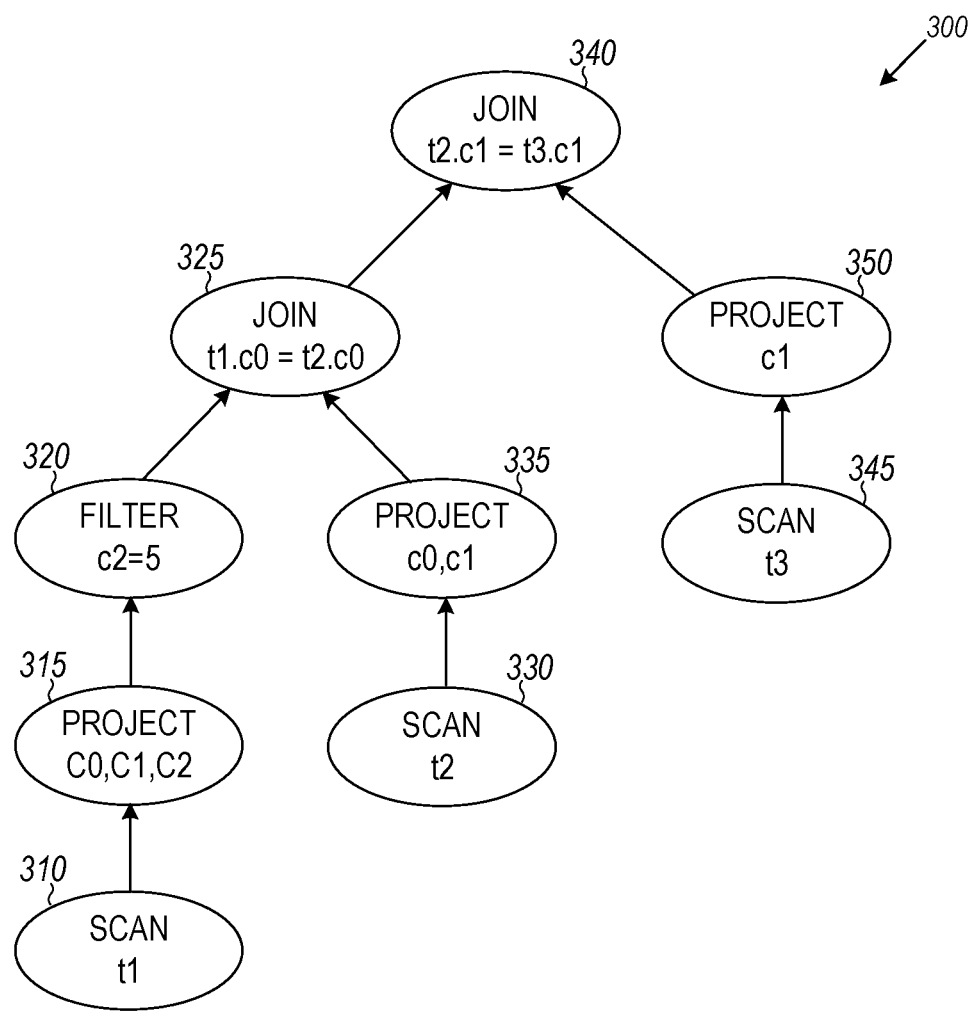
FIG. 3 is a representation of an example query plan tree that may generated by a database system according to an example embodiment.

A query plan tree that may be generated by a database system is illustrated at 300 in FIG. 3, and may be provided to a system performing the operations of method 200. The generation of such query plan trees are ubiquitous in database systems and may be produced in many different ways.

The query plan tree 300 shows several operations corresponding to nodes that are to be performed in execution of the query plan tree, or a cost optimized version of such a tree in prior systems. Note that execution of the tree 300 occurs from the bottom up, with a scan node 310 of t1 being scheduled, followed by a project node at 315 of c0, c1, and c2, a filter node at 320 for c2=5, and join node of t1.c0=t2.c0 at 325. Before the join represented by join node 325 can be executed, t2 is scanned at 330, and a project node 335 of c0, c1 is scheduled at 335. Once join node 325 is scheduled, a join node at 340 of t2.c1=t3.c1 should occur. First, t3 is scanned at scan node 345 and c1 is determined at project node 350. Thus, the tree 300 represents the operations that should be performed to execute the query.

Figure 4:
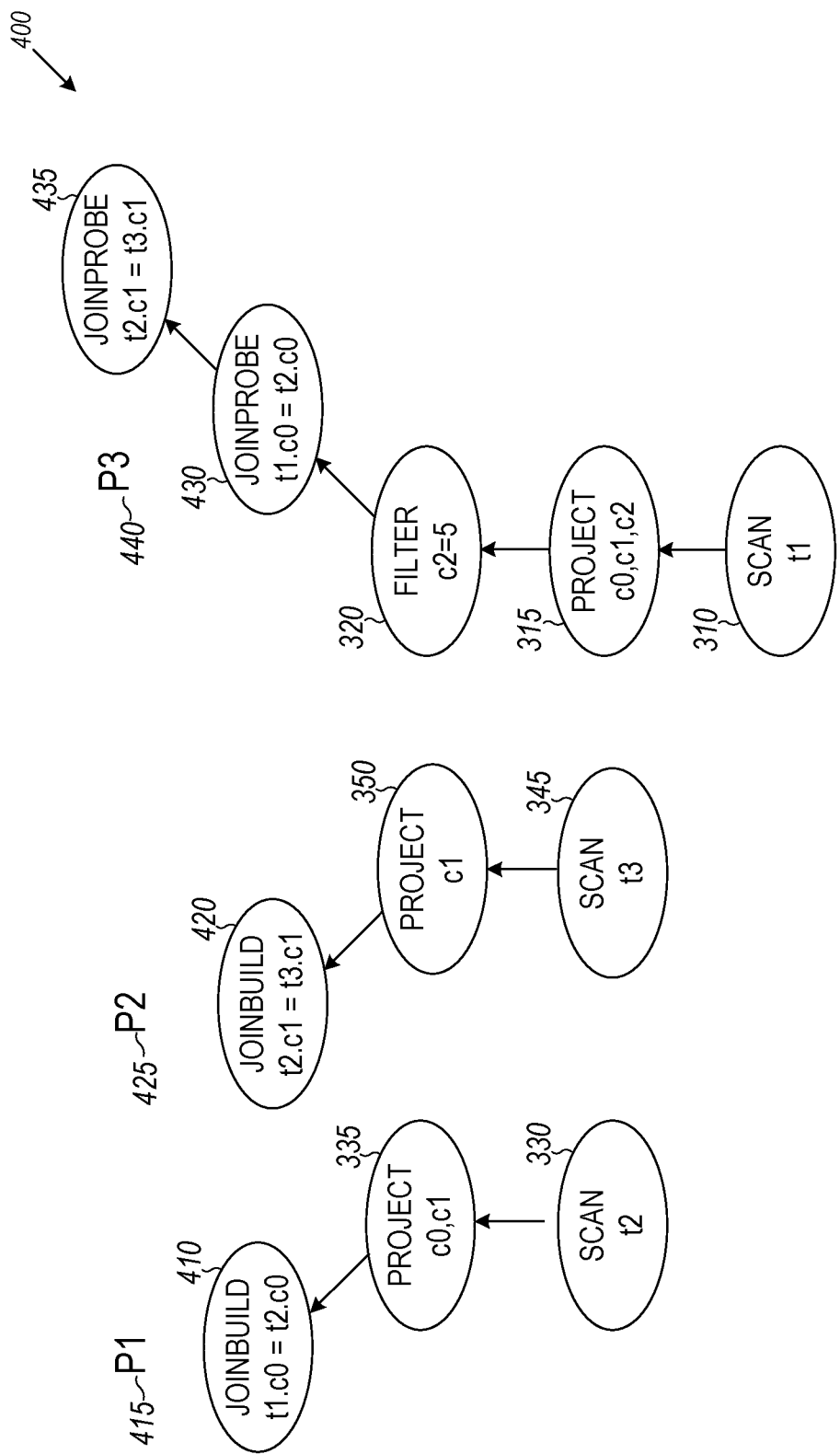
FIG. 4 is a block diagram illustration of multiple pipelines that may be generated from the tree of FIG. 3 according to an example embodiment.

FIG. 4 is a block diagram illustration of multiple pipelines that may be generated from the tree 300. In one embodiment, the scan node 330 and project node 335 form a branch of the tree having a parent node 410 of JoinBuild node t1.c0=t2.c0. This branch is identified as pipeline 1 (P1) at 415. A second branch comprises scan node 345, project node 350 and a parent node of JoinBuild node t1.c0=t2.c0 at 420. This branch forms a pipeline 2 (P2) at 425. A further branch comprises scan node 310, project node 315, filter node 320, a JoinProbe node t1.c0=t2.c0 at 430 and a parent node of JoinProbe node t2.c1=t3.c1 at 435, forming pipeline 3 (P3) at 440.

Figure 5:
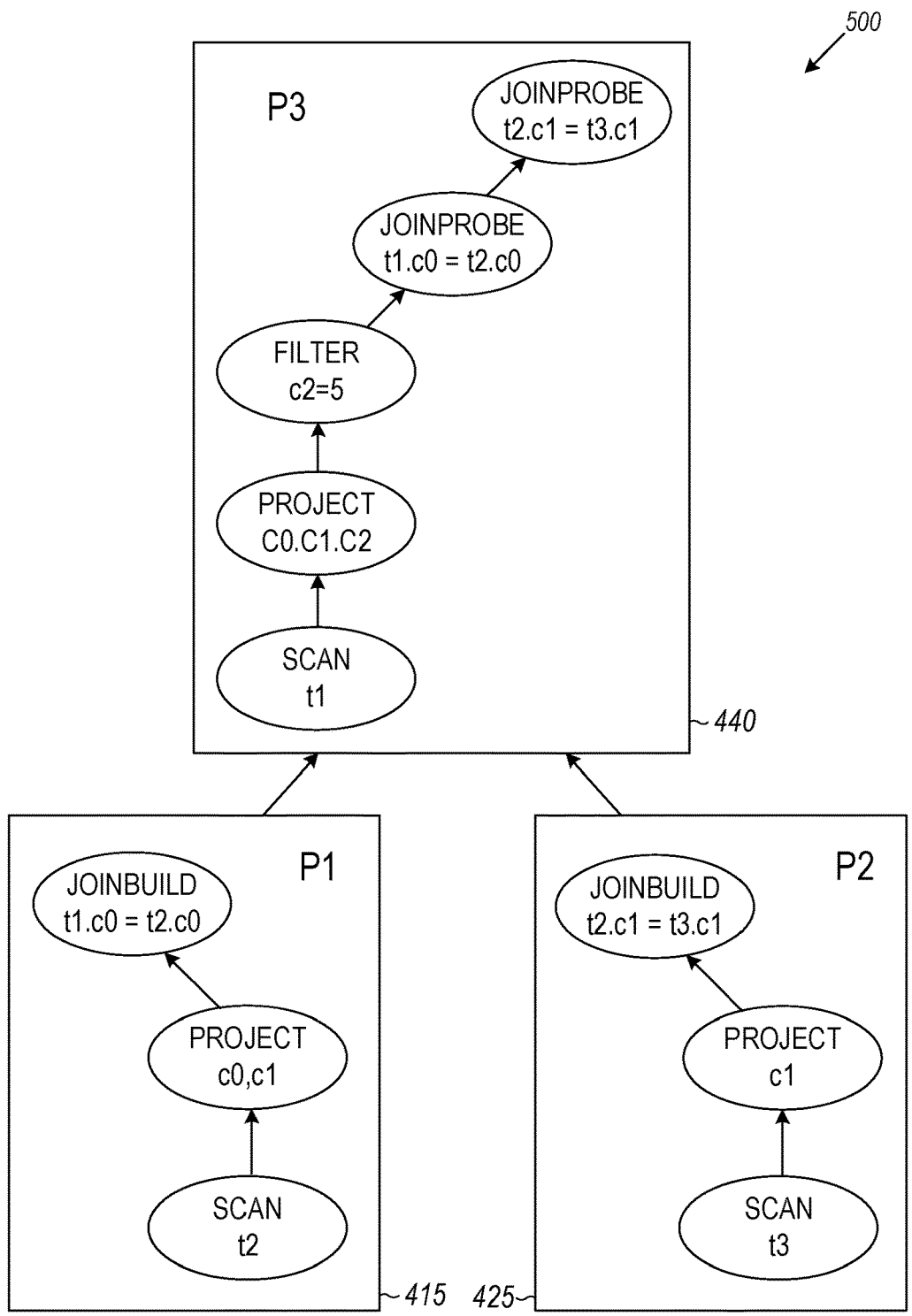
FIG. 5 is a block diagram illustrating the resulting pipeline dependent tree according to an example embodiment.

FIG. 5 is a block diagram illustrating the resulting pipeline dependent tree at 500, comprising P1 415, P2, 425, and P3 440. Note that execution should occur from the bottom up, with pipelines on the same level being performable by different processors in parallel.

Figure 6:
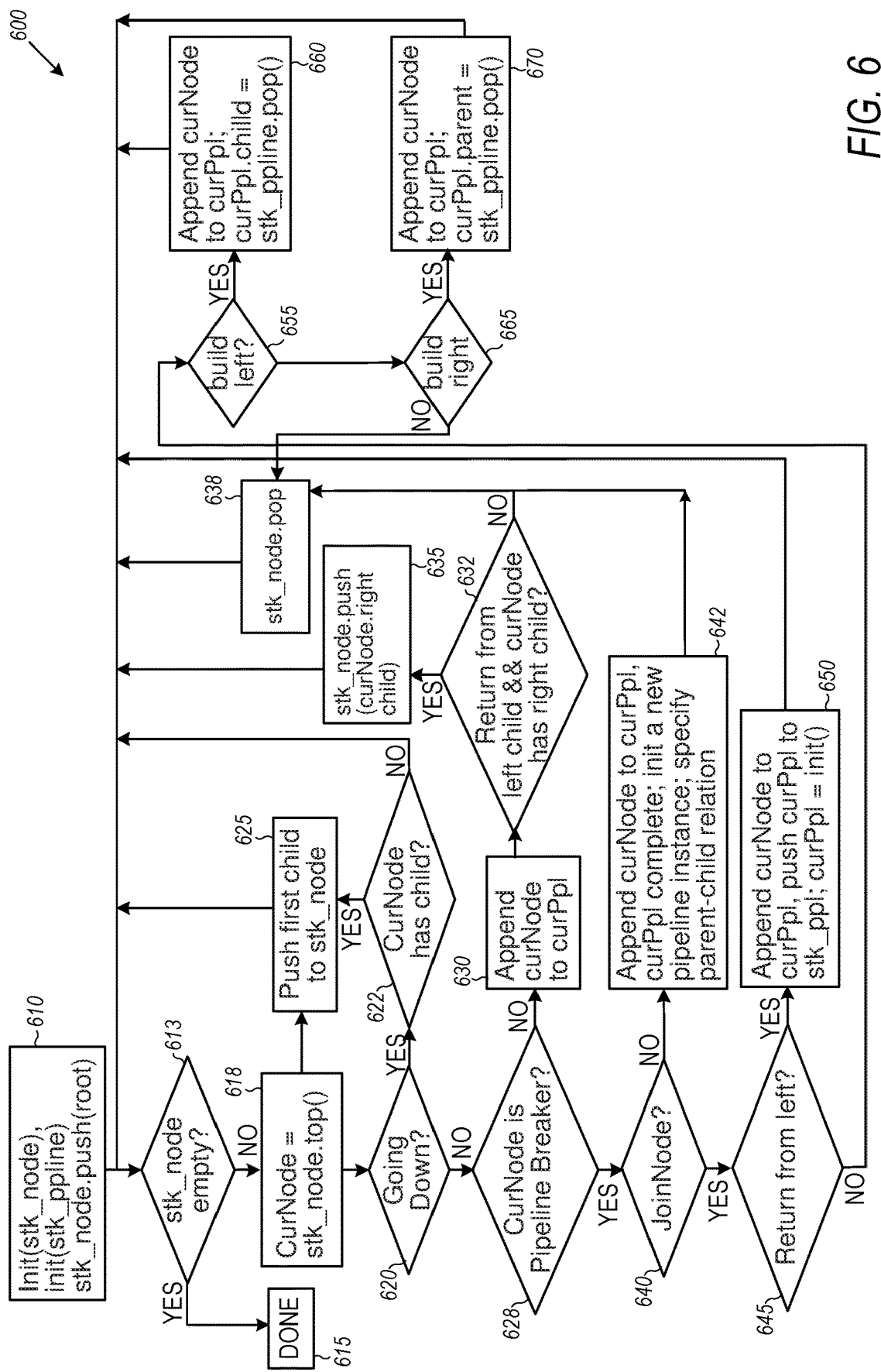
FIG. 6 is a flowchart illustrating a method of traversing a query plan tree to generate a pipeline dependent tree according to an example embodiment.

FIG. 6 is a flowchart illustrating a method 600 of traversing a query plan tree to generate a pipeline dependent tree according to an example embodiment. At 610 stacks are initiated based on the query plan tree and include a node stack and pipeline stack. A root of the node stack is used to begin traversal. An iterative post-order traversal ensures that the query plan tree may be visited once.

At 613, a decision block determines if the node stack is empty. If yes, generation of the pipeline dependent tree is done at 615. If no, at 618, the current node is set to the top of the stack of nodes. A determination is then made at 620 whether traversal is proceeding down. If yes, a decision is made at 622 to determine if the current node has a child node. If yes, the first child is pushed to the stack of nodes at 625, and processing returns to 613 to determine whether or not the stack of nodes is empty. If no child node is found, processing also returns to 613.

If at 620, it was determined that traversal was not proceeding down, a determination is made at 628 whether the current node is a pipeline breaker. If not, the current node is appended to the current pipeline at 630, an a determination is made at 632 whether or not a return from a left child node and current node has a right child. If yes, the stack of nodes pushes the current node right child at 635 and returns to 613. If no, the stack of nodes is popped at 638 and processing returns to 613.

If at 628, the current node was a pipeline breaker, a determination is made whether the current node is a join node at 640. A pipeline breaker is identified by a necessity to materialize an intermediate result. If the current node is not a join node, the current node is appended to the current pipeline, which is designated as complete at 642. A new pipeline instance is initiated, and a parent-child relationship may be specified. The stack node is then popped at 638 and processing returns to 613.

If at 640 the current node is a join node, a decision block 645 determines if a return from a left of the tree occurred. If yes, at 650, the current node is appended to the current pipeline, the current pipeline is pushed to a stack of pipelines, stk_ppl, and at 655, a determination is made whether the build of the join is to the left. If yes, the current node is appended to the current pipeline at 660, the stack of pipelines is popped, with the popped element being assigned to the child of the current pipeline and processing returns to 613. If no, a determination is made whether a build right occurred at 665, and if so, the current node is appended to the current pipeline, the pipelines is popped with the popped pipeline being assigned to the parent of the current pipeline, and processing returns to 613. If a build right at 665 did not occur, processing proceeds to 638, where the stack of nodes is popped.

Pseudocode corresponding to method 600, including comments and reference numbers consistent with FIG. 6, follows:

---

Initialize two stacks: stk_node stk_pipeline; /* they store operator nodes and pipeline respectively */
pre_node = null /* the last visited node; used together with its parent to determine the traversal direction. */
Pipeline = empty /* the current processed pipeline */
Push root node of execution plan to sik_node; -- 610
while(stk_node != null){ -- 613
   cur_node = stk.node.top( ); -- 618
   if(goingDown) /* traverse top-down */ -- 620
     if cur_node has children, push the first child to stk_node; -- 622, 625
   else
     if(cur_node isn't pipeline breaker) -- 628
       add cur_node to current pipeline -- 630
       if(goingUp && backtracked from left child node && cur_node has right child node) -- 632
         stk_node.push(cur_nodesightChild); -- 635
       else stk_node.pop( ); -- 638
     else
       if(cur_node is join operator) -- 640
         if(goingUp && backtracked from left child node) -- 645
           add cur_node to current pipeline; -- 650
           sik_pipeline.push(pipeline) --650
           pipeline = new Pipeline( ); -- 650
         else if(buildside==buildleft) -- 655
           add cur_node to current pipeline; stk_pipeline.pop( ); current pipline.Child = popped element; -- 660
         else if(buildside == buildright) -- 665
           add cur_node to current pipeline; stk_pipeline.pop( ); current pipeline.parent = popped element; -- 660
           the current pipeline is complete; -- 660
           if(cur_node has right child node) -- 665
stk_node.push(cur_node.rightChild);
         else stk_node.pop( ); -- 638
       else // other pipeline breakers; unaryNode;
         add cur_node to current pipeline; current pipeline is complete ; -- 670
         newpipeline = new Pipeline( ); pipeline.parent = newpipeline; -- 670
s         pipeline = newpipeline; stk_node.pop( ) -- 670
} // end while

---

Figure 7:
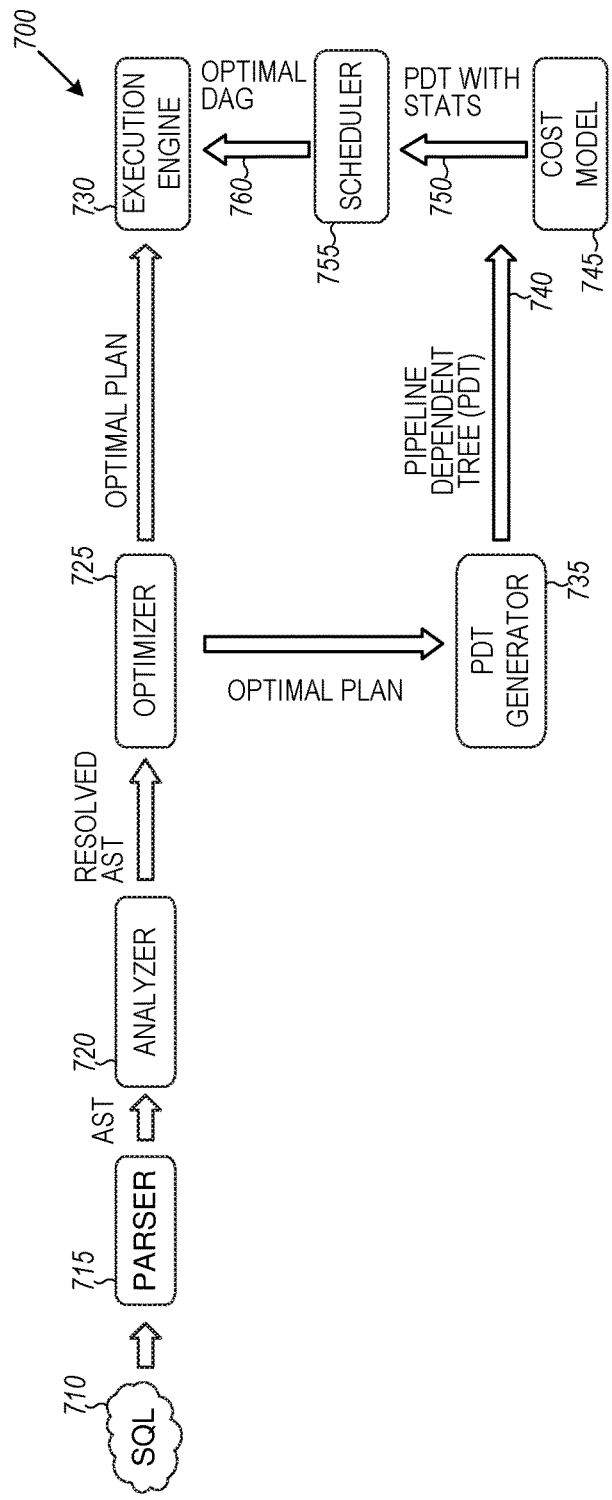
FIG. 7 is a block flow diagram illustrating application of a cost model to a pipeline dependent tree (PDT) according to an example embodiment.

FIG. 7 is a block flow diagram illustrating generally at 700, application of a cost model to a pipeline dependent tree (PDT) according to an example embodiment. An SQL query is represented as being received at 710 and parsed at 715 to provide an abstract syntax tree (AST). A database engine analyzer 720 is used to resolve the AST and provide the resolved AST to an optimizer 725. The operations performed so far are conventional and result in an optimal plan in the form of a query plan tree as shown previously. In prior database systems, the optimal plan is provided to an execution engine 730 for performance of the query using the query plan tree.

In one embodiment of the present inventive subject matter, the query plan tree is provided from the optimizer 725 to a PDT generator 735 which traverses the query plan tree to generate multiple pipelines in the form of a pipeline dependent tree 740. The pipeline dependent tree 740 is provided to a cost model 745. The cost model is configured to calculate cost based metrics, such as data size and number of rows in an input stream, data size and number of rows in an output stream, the cost of executing an entire pipeline in terms of computational resources such as a number of cores (such as processors on a host), memory consumption, and estimated time to complete the execution of the query.

The PDT with statistics provided by the cost model may be provided at 750 to a scheduler 755, which may provide an optimal directed acyclic graph (DAG) at 760 of the query with multiple pipelines and resources to utilize to execute the query via the execution engine 730. In various embodiments, the scheduler 755 may generate the DAG based on a variety of different goals.

Figure 8:
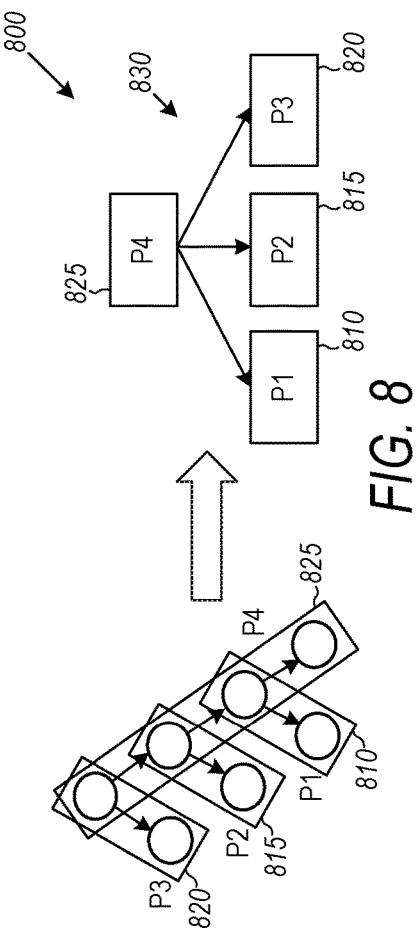
FIG. 8 is a block flow diagram 800 illustrating an example PDT and resulting directed acyclic graph (DAG) according to an example embodiment.

FIG. 8 is a block flow diagram 800 illustrating an example PDT and resulting DAG. The PDT is shown as a tree of nodes with pipelines P1 810, P2 815, P3 820, and P4 825. The DAG is indicated generally at 830, and illustrates P1, P2, and P3 on one level 2, with P4 on a level 1 as the parent. Thus, P1, P2, and P3 are child pipelines of P4 and are siblings with each other. P1, P2, and P3 are independent pipelines, each having the same dependent level 2. As independent pipelines, P1, P2, and P3 are eligible to be scheduled to run in parallel, which is best suited for modern central processing unit (CPU) architectures utilizing multiple CPU cores.

In one embodiment, scheduling of the pipelines may be based on a least wait-time basis. A parent pipeline will wait until all child pipelines are completed prior to executing. The goal is to minimize the total wait-time of parent pipelines before they can be scheduled to run without violating data dependencies among pipelines. In a traditional query processing system, the pipelines would be executed in the following order: P1→P2→P3→P4, with a total execution time of T(P1)+T(P2)+T(P3)+T(P4). However, in the best case where sufficient resources are available, by scheduling on a least wait-time basis, P1/P2/P3 may be scheduled to run in parallel resulting in an execution time of T(P4)+ Max (T(P1), T(P2), T(P3)). P4 need only wait as long as the longest execution time of the pipelines from the lower level, which can be much less than proceeding serially as traditionally done.

Figure 9:
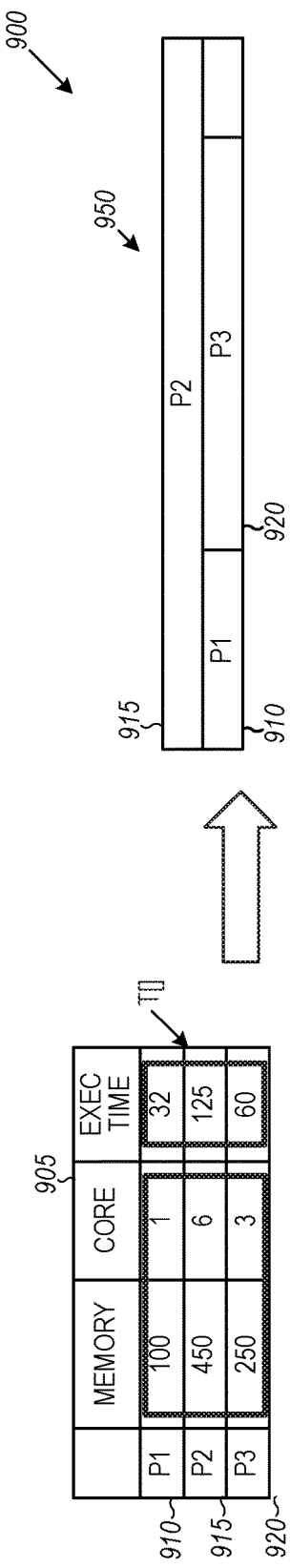
FIG. 9 is an illustration of an alternative least wait-time based scheduling method according to an example embodiment.

FIG. 9 is an illustration of an alternative least wait-time based scheduling method 900. Given a total available computation resources vector, RA[ ] and an estimated pipeline execution time vector T[ ], a computation resource vector of pipelines RR[ ] may be found using a greedy algorithm to fit each pipeline into a few groups (# of hosts). Each pipeline, P1 910, P2, 915, and P3 920 is illustrated in a table 905 of corresponding resources to be used for execution. Memory, a number of cores, and an execution time is provided in table 905 for each pipeline by cost model 745. In each group, the sum of require computation resource is no more than the available resource. Overlapping of pipeline execution times may be maximized across different groups.

A resource table 940 illustrates two hosts, host 1 and host 2, their memory resource, and their number of cores, which in both instances happens to be 10. As can be noted from table 905, P2 takes the longest time to execute. A graphic 950 illustrates that both P1 and P3 could execute serially, T(P1)+T(P3), using the same resources (4 of the 10 cores available on either host), during the time, T(P2) it takes for P2 to execute. This allows P2 to be scheduled on host 1 and P1 and P3 scheduled on host 2 to execute at the same time by scheduler 755. Note that by determining that two of the three pipelines may execute serially in the same time as a longest time pipeline, a third host is not needed in order for the query to run in the least time. In this example, the three pipelines on the same level may execute in a total time of T(P2).

Figure 10:
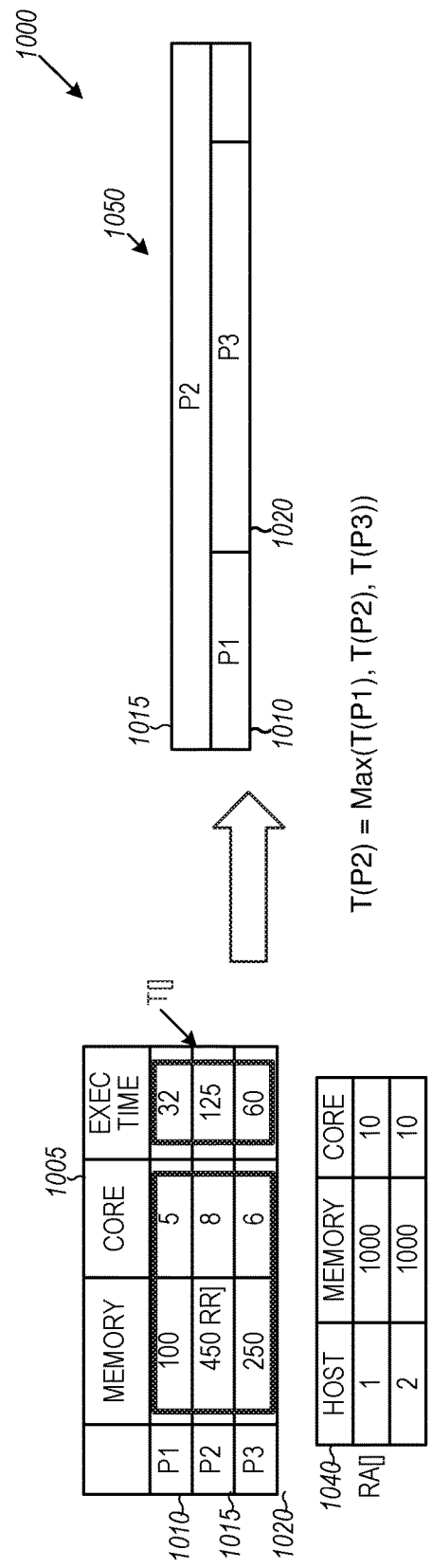
FIG. 10 is an illustration of an alternative least wait-time based scheduling method according to an example embodiment.

FIG. 10 is an illustration of an alternative least wait-time based scheduling method 1000. Given a total available computation resources vector, RA[ ] and an estimated pipeline execution time vector T[ ], a computation resource vector of pipelines RR[ ] may be found using a greedy algorithm to fit each pipeline into a few groups (# of hosts). Each pipeline, P1 1010, P2, 1015, and P3 1020 is illustrated in a table 1005 of corresponding resources to be used for execution. Memory, a number of cores, and an execution time is provided in table 1005 for each pipeline by cost model 745. P2 is scheduled on host 1. A resource table 1040 illustrates two hosts, host 1 and host 2, their memory resource, and their number of cores, which in both instances happens to be 10. P1 and P3 are scheduled on host 2.

A graphic 1050 illustrates that both P1 and P3 could execute serially, T(P1)+T(P3), using the same resources (the 10 cores available on either host), during the time, T(P2) it takes for P2 to execute. This allows P2 to be scheduled on host 1 and P1 and P3 scheduled on host 2 to execute at the same time. Note that P1 uses 5 cores and P3 uses 6 cores from table 1005. They cannot run simultaneously on host 2, as host 2 only has resources of 10 cores. However, even running P3 after P1, the total execution time is still an that of P2.

In a further embodiment, with reference to FIG. 8, location aware dispatch of pipelines may be utilized. In some queries, there may be a need to materialize intermediate results. In other words, some calculations may need to be performed to provide desired information. Such a materialization may lead to a pipeline being referred to as broken. Data may need to be shared between pipelines before processing can continue. Generally, data sharing, referred to as data shuffling may be performed for two dependent pipelines.

In one example, data shuffling may happen between P1 and P4, P2 and P4, and P3 and P4 if P1, P2, and P3 are scheduled on different hosts. This may result in up to 2+2+2=6 shuffles. If different hosts are networked, network delays could add significantly to query execution time if shuffles are needed. Locality-aware dispatch may be used to schedule as many sibling pipelines as possible to a same host without violating resource constraints. Shuffling may be significantly reduced, as cores in the same host may be able to share memory and avoid the use of a shuffle, or at least perform a shuffle fairly quickly. In one embodiment, locality-aware dispatching may be used as a heuristic supplement to least wait-time scheduling provided no violation of data dependency or constraints of available computation resources occur.

In a further embodiment utilizing the same example, all intermediate results belonging to a same partition are scheduled on one host, such as host 1. P1/P2/P3 may be scheduled on one host as can be seen from FIG. 9, where neither memory constraints nor core availability is violated. P2 and P1 may run simultaneously as a total of 7 of the 10 available cores would be used, and P3 may launch after P1 is done. When P4 is launched to probe P1/P2/P3, the number of shuffling can be reduced to 4 (1 for P1, 1 for P2, 1 for P3, and 1 for P4).

Figure 11:
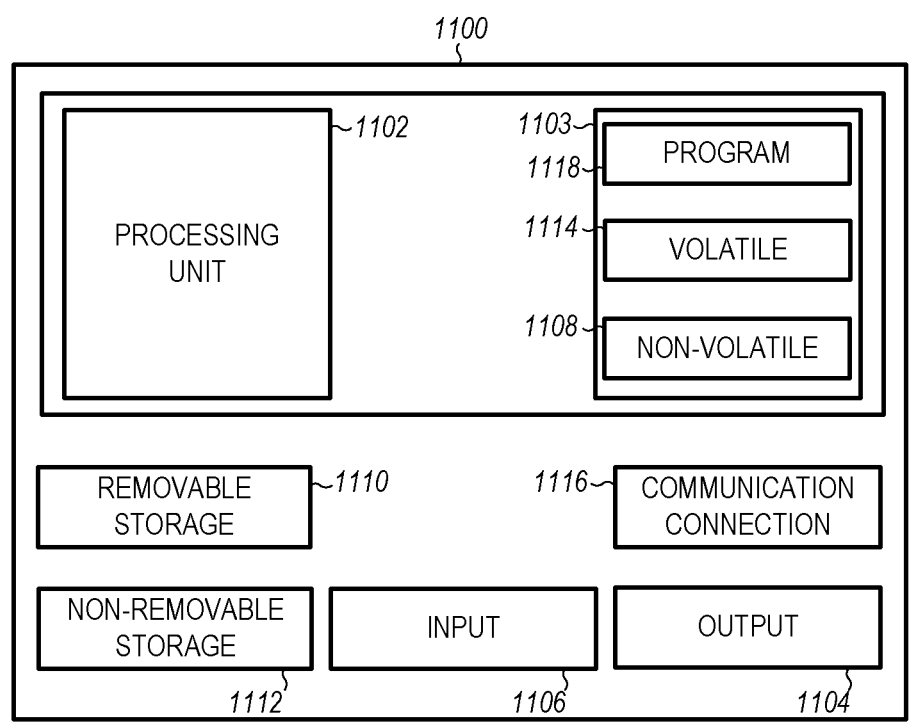
FIG. 11 is a block diagram illustrating circuitry for clients, servers, cloud based resources for implementing algorithms and performing methods according to example embodiments.

FIG. 11 is a block diagram illustrating circuitry for implementing a database system for generating and executing pipeline dependent trees from query plan trees for implementing algorithms and performing methods according to example embodiments. All components need not be used in various embodiments. For example, the clients, servers, and cloud based network resources may each use a different set of components, or in the case of servers for example, larger storage devices.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, or other computing device including the same or similar elements as illustrated and described with regard to FIG. 11. Devices, such as smartphones, tablets, and smartwatches, are generally collectively referred to as mobile devices or user equipment. Further, although the various data storage elements are illustrated as part of the computer 1100, the storage may also or alternatively include cloud-based storage accessible via a network, such as the Internet or server based storage.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input 1106, output 1104, and a communication connection 1116. Output 1104 may include a display device, such as a touchscreen, that also may serve as an input device. The input 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 1102 of the computer 1100. A hard drive, CD-ROM, and RAM are some examples of articles including a non-transitory computer-readable medium such as a storage device. The terms computer-readable medium and storage device do not include carrier waves to the extent carrier waves are deemed too transitory.

EXAMPLES

1. In example 1, a method includes extracting, by one or more processors, multiple pipelines from a query plan tree that has multiple nodes and is stored in a memory, wherein each node is representative of an operation on data that is the subject of the query, by traversing the query plan tree to identify a sequence of nodes for each pipeline and starting a new pipeline as a function of encountering a pipeline breaker node that corresponds to a node representing an operation that materializes an intermediate result, identifying dependencies between the multiple extracted pipelines, and generating a pipeline dependent tree based on the dependencies between the multiple extracted pipelines for execution of the operations represented by the sequence of nodes in each pipeline by multiple processors.

2. The method of example 1 wherein traversing the query plan tree comprises using an iterative post-order traversal of the query plan tree to visit each node only once, starting with a root node.

3. The method of example 2 wherein traversing the query plan tree comprises initiating a node stack with nodes of the query plan tree, including a root node, initiating a pipeline stack, and determining if a current node in the node stack is a pipeline breaker.

4. The method of example 3 wherein if the current node is not a pipeline breaker, the current node is appended to a current pipeline in the pipeline stack.

5. The method of example 3 wherein traversing the query plan tree further comprises, if the current node is a pipeline breaker, determining if the current node is a join node and if not a join node, appending the current node to a current pipeline in the pipeline stack, initiating a new pipeline in the pipeline stack, and specifying a parent-child relationship between the current pipeline and the new pipeline.

6. The method of example 1 and further comprising scheduling the multiple pipelines to execute in parallel on multiple processors and executing the multiple pipelines on the multiple processors in accordance with the scheduling.

7. The method of example 6 wherein the multiple pipelines executing in parallel comprise independent pipelines, where a parent pipeline is a first level pipeline, child pipelines of the parent pipeline are second level pipelines, and independent pipelines are child pipelines on the same level.

8. The method of example 7 wherein the multiple pipelines are scheduled to run on multiple processors based on a least wait time for parent pipelines without violating data dependencies among pipelines.

9. The method of example 6 wherein the multiple pipelines are scheduled to run as a function of not exceeding computation resources of a host and maximizing overlapping pipeline execution times across host resources.

10. The method of example 6 wherein the multiple pipelines are scheduled to run as a function of locality aware dispatching without violating resource constraints and avoiding unnecessary data shuffles.

11. In example 11, a device includes a non-transitory memory storage comprising instructions and one or more processors in communications with the memory storage. The one or more processors execute the instructions to traverse a query plan tree having multiple nodes, each node representative of an operation on data that is the subject of a query, to extract multiple pipelines from the query plan tree that has multiple nodes and is stored in a memory, wherein each node is representative of an operation on data that is the subject of the query, by traversing the query plan tree to identify a sequence of nodes for each pipeline and starting a new pipeline as a function of encountering a pipeline breaker node that corresponds to a node representing an operation that materializes an intermediate result, identify dependencies between the multiple extracted pipelines, and generate a pipeline dependent tree based on the dependencies between the multiple extracted pipelines for execution of the operations represented by the sequence of nodes in each pipeline by multiple processors.

12. The device of example 11 wherein traversing the query plan tree comprises using an iterative, post-order traversal of the query plan tree to visit each node only once, starting with a root node.

13. The device of example 11 wherein traversing the query plan tree comprises initiating a node stack with nodes of the query plan tree, including a root node, initiating a pipeline stack, and determining if a current node in the node stack is a pipeline breaker, wherein if the current node is not a pipeline breaker, the current node is appended to a current pipeline in the pipeline stack, and wherein if the current node is a pipeline breaker, determining if the current node is a join node and if not a join node, appending the current node in the pipeline stack to a current pipeline, initiating a new pipeline in the pipeline stack, and specifying a parent-child relationship between the current pipeline and the new pipeline.

14. The device of example 11 and further comprising scheduling the multiple pipelines to execute in parallel on multiple processors wherein the multiple pipelines to run in parallel comprise independent pipelines, where a parent pipeline is a first level pipeline, child pipelines of the parent pipeline are second level pipelines, and independent pipelines are child pipelines on the same level, and executing the multiple pipelines on the multiple processors in accordance with the scheduling.

15. The device of example 14 wherein the multiple pipelines are scheduled to run on multiple processors based on a least wait time for parent pipelines without violating data dependencies among pipelines.

16. The device of example 15 wherein the multiple pipelines are scheduled to run as a function of not exceeding computation resources of a host and maximizing overlapping pipeline execution times across host resources and wherein the multiple pipelines are scheduled to run as a function of locality aware dispatching without violating resource constraints and avoiding unnecessary data shuffles.

17. In example 17, a non-transitory computer-readable media storing computer instructions, that when executed by one or more processors, cause the one or more processors to perform the steps of traversing a query plan tree having multiple nodes, each node representative of an operation on data that is the subject of a query, to extract multiple pipelines from the query plan tree, identify dependencies between the multiple extracted pipelines, and provide a pipeline dependent tree based on the dependencies between the multiple extracted pipelines for execution of the query by multiple processors.

18. The non-transitory computer-readable media of example 17 wherein traversing the query plan tree comprises using an iterative post-order traversal of the query plan tree to visit each node only once.

19. The non-transitory computer-readable media of example 17 wherein traversing the query plan tree comprises determining if a current node is a pipeline breaker, wherein if the current node is not a pipeline breaker, the current node is appended to a current pipeline, and wherein if the current node is a pipeline breaker, determining if the current node is a join node and if not a join node, appending the current node to a current pipeline, initiating a new pipeline, and specifying a parent-child relationship between the current pipeline and the new pipeline.

20. The non-transitory computer-readable media of example 17 and further comprising scheduling the multiple pipelines to run in parallel on multiple processors wherein the multiple pipelines to nm in parallel comprise independent pipelines, where a parent pipeline is a first level pipeline, child pipelines of the parent pipeline are second level pipelines, and independent pipelines are child pipelines on the same level, wherein the multiple pipelines are scheduled to run on multiple processors based on a least wait time for parent pipelines without violating data dependencies among pipelines, wherein the multiple pipelines are scheduled to run as a function of not exceeding computation resources of a host and maximizing overlapping pipeline execution times across host resources and wherein the multiple pipelines are scheduled to run as a function of locality aware dispatching without violating resource constraints and avoiding unnecessary data shuffles.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:
1. A method comprising:
extracting, by one or more processors, multiple pipelines from a query plan tree for a query for data, the query plan tree having multiple nodes and being stored in a memory, wherein each node is representative of an operation on the data, the extracting comprising:
traversing the query plan tree to identify a sequence of nodes for each pipeline; initiating a node stack with nodes of the query plan tree, including a root node; initiating a pipeline stack; and
starting a new pipeline based on encountering a pipeline breaker node that corresponds to a node representing an operation that materializes an intermediate result, wherein the starting of the new pipeline comprises:
based on a current node being the pipeline breaker node and not being a join node:
appending the current node to a current pipeline in the pipeline stack;
initiating the new pipeline in the pipeline stack; and
specifying a parent-child relationship between the current pipeline and the new pipeline;
identifying dependencies between the multiple extracted pipelines; and
generating a pipeline dependent tree based on the dependencies between the multiple extracted pipelines for execution of the operations represented by the sequence of nodes in each pipeline by multiple processors.

2. The method of claim 1, wherein the traversing of the query plan tree comprises using an iterative post-order traversal of the query plan tree to visit each node only once, starting with the root node.

3. The method of claim 1, wherein if a second current node is not a pipeline breaker, the second current node is appended to Ha 11 the current pipeline in the pipeline stack.

4. The method of claim 1, further comprising:
scheduling the multiple pipelines to execute in parallel on multiple processors; and
executing the multiple pipelines on the multiple processors in accordance with the scheduling.

5. The method of claim 4, wherein the multiple pipelines are scheduled to execute in parallel on the multiple processors based on a least wait time for parent pipelines without violating data dependencies among pipelines.

6. The method of claim 4, wherein the multiple pipelines are scheduled to execute in parallel based on not exceeding computation resources of a host and maximizing overlapping pipeline execution times across host resources.

7. The method of claim 4, wherein the multiple pipelines are scheduled to execute in parallel based on locality aware dispatching without violating resource constraints and avoiding unnecessary data shuffles.

8. A device comprising:
a non-transitory memory storage comprising instructions; and
one or more processors in communications with the memory storage, wherein the one or more processors execute the instructions to:
extract multiple pipelines from a query plan tree for a query for data, the query plan tree having multiple nodes and being stored in a memory, wherein each node is representative of an operation on the data, the extracting comprising:
traversing the query plan tree to identify a sequence of nodes for each pipeline;
initiating a node stack with nodes of the query plan tree, including a root node;
initiating a pipeline stack; and
starting a new pipeline based on encountering a pipeline breaker node that corresponds to a node representing an operation that materializes an intermediate result, wherein the starting of the new pipeline comprises:
based on a current node being the pipeline breaker node and not being a join node:
appending the current node to a current pipeline in the pipeline stack;
initiating the new pipeline in the pipeline stack; and
specifying a parent-child relationship between the current pipeline and the new pipeline;
identify dependencies between the multiple extracted pipelines; and
generate a pipeline dependent tree based on the dependencies between the multiple extracted pipelines for execution of the operations represented by the sequence of nodes in each pipeline by multiple processors.

9. The device of claim 8, wherein the traversing of the query plan tree comprises using an iterative post-order traversal of the query plan tree to visit each node only once, starting with the root node.

10. The device of claim 8, wherein the one or more processors are further to:
schedule the multiple pipelines to execute in parallel on multiple processors; and
execute the multiple pipelines on the multiple processors in accordance with the scheduling.

11. The device of claim 10, wherein the multiple pipelines are scheduled to execute in parallel on the multiple processors based on a least wait time for parent pipelines without violating data dependencies among pipelines.

12. The device of claim 11, wherein the multiple pipelines are scheduled to execute in parallel based on not exceeding computation resources of a host and maximizing overlapping pipeline execution times across host resources.

13. A non-transitory computer-readable media storing computer instructions, that when executed by one or more processors, cause the one or more processors to perform the steps of:
extracting multiple pipelines from a query plan tree for a query for data, the query plan tree having multiple nodes and being stored in a memory, wherein each node is representative of an operation on the data, the extracting comprising:
traversing the query plan tree to identify a sequence of nodes for each pipeline;
initiating a node stack with nodes of the query plan tree, including a root node;
initiating a pipeline stack; and
starting a new pipeline based on encountering a pipeline breaker node that corresponds to a node representing an operation that materializes an intermediate result, wherein the starting of the new pipeline comprises:
based on a current node being the pipeline breaker node and not being a join node:
appending the current node to a current pipeline in the pipeline stack;
initiating the new pipeline in the pipeline stack; and
specifying a parent-child relationship between the current pipeline and the new pipeline:
identifying dependencies between the multiple extracted pipelines; and
providing a pipeline dependent tree based on the dependencies between the multiple extracted pipelines for execution of the query by multiple processors.

14. The non-transitory computer-readable media of claim 13, wherein the traversing of the query plan tree comprises using an iterative post-order traversal of the query plan tree to visit each node only once.

15. The non-transitory computer-readable media of claim 13, wherein the steps further comprise:
scheduling the multiple pipelines to execute in parallel on multiple processors based on a least wait time for parent pipelines without violating data dependencies among pipelines; and
executing the multiple pipelines on the multiple processors in accordance with the scheduling.

16. The non-transitory computer-readable media of claim 13, wherein the multiple pipelines are further scheduled to execute in parallel based on not exceeding computation resources of a host and maximizing overlapping pipeline execution times across host resources.

17. The non-transitory computer-readable media of claim 13, wherein t multiple pipelines are further scheduled to execute in parallel based on locality aware dispatching without violating resource constraints and avoiding unnecessary data shuffles.

* * * * *

UNITED STATES PATENT AND TRADEMARK OFFICE
CERTIFICATE OF CORRECTION

PATENT NO. : 10,671,607 B2
APPLICATION NO. : 15/274681
DATED : June 2, 2020
INVENTOR(S) : Qiu et al.

Page 1 of 1

It is certified that error appears in the above-identified patent and that said Letters Patent is hereby corrected as shown below:

In the Claims

In Column 13, Line 3, in Claim 3, after "to", delete "Ha 11"

In Column 14, Line 34, in Claim 13, delete "pipeline:" and insert --pipeline;-- therefor In Column 14, Line 58, in Claim 17, delete "t" and insert --the-- therefor Signed and Sealed this
Twenty-fifth Day of August, 2020

Andrei Iancu
*Director of the United States Patent and Trademark Office*